(12) United States Patent
Haselden (10) Patent No.: US 7,685,582 B2
(45) Date of Patent: Mar. 23, 2010

(54) LOOPING CONSTRUCTS IN OBJECT MODEL SOFTWARE

(75) Inventor: J. Kirk Haselden, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 10/958,726

(22) Filed: Oct. 5, 2004

(65) Prior Publication Data

US 2006/0075403 A1    Apr. 6, 2006

(51) Int. Cl.
*G06F 9/45* (2006.01)
(52) U.S. Cl. ..................................... 717/150
(58) Field of Classification Search ........................ None
See application file for complete search history.

(56) References Cited

U.S. PATENT DOCUMENTS

| | | | | |
|---|---|---|---|---|
| 6,604,198 | B1 * | 8/2003 | Beckman et al. | 713/167 |
| 2003/0078820 | A1 * | 4/2003 | Ouchi | 705/7 |
| 2003/0208493 | A1 * | 11/2003 | Hall et al. | 707/100 |
| 2005/0010902 | A1 * | 1/2005 | Takacsi-Nagy et al. | 717/114 |
| 2005/0022164 | A1 * | 1/2005 | Takacsi-Nagy | 717/117 |
| 2006/0059114 | A1 * | 3/2006 | Wuest | 707/1 |
| 2006/0288334 | A1 * | 12/2006 | Tian et al. | 717/127 |

OTHER PUBLICATIONS

Elliotte Rusty Harold, Processing XML with Java, Addison Wesley Professional, Nov. 5, 2002.*
Oracle Database 10g Documentation Titles and Part Numbers, "PL/SQL User's Guide and Reference", Oracle 10g Release 1 (10.1).*
"Interface Enumeration", retrieved from http://java.sun.com/j2se/1.4.2/docs/api/java/util/Enumeration.html on Sep. 2, 2009.*
"Class Collections", retrieved from http://java.sun.com/j2se/1.4.2/docs/api/java/util/Collections.html on Sep. 4, 2009.*
Oracle Database 10g Documentation Titles and Part Numbers, "PL/SQL User's Guide and Reference", Oracle 10g Release 1 (10.1) . Dec. 2003.*
Grunder, H. et al., "On the Object-Oriented Modeling of Distributed Workflow Applications", *Internationale Tagung Wirtschaftsinformatik*, 1997, 3, 581-598.

* cited by examiner

*Primary Examiner*—Philip Wang
(74) *Attorney, Agent, or Firm*—Woodcock Washburn LLP (57) ABSTRACT

A system and method for providing looping constructs to an object model where the looping construct is contained within a child object of a parent object. The system and method further provides for an enumerator to map between indexes representing a collection of objects to a child object comprising a looping construct, and thereby enabling iterations for each variable of the collection of objects.

13 Claims, 4 Drawing Sheets

LOOPING CONSTRUCTS IN OBJECT MODEL SOFTWARE

FIELD OF THE INVENTION

The invention generally relates to object model software applications and particularly to looping constructs within an object model.

BACKGROUND OF THE INVENTION

In applications coded in programming languages such as C, Pascal, etc., it is common for a section of the program to be executed multiple times, with each execution occurring immediately upon completion of a prior execution. This repetition of workflow may be referred to as iterative programming or "looping." Looping is an important programming technique that enables an application to repeat a set of instructions or display output over and over until a condition is or a set of conditions are met. Looping may allow a programmer to repeat a set of instructions in an efficient, logical way. Not only may looping be efficient, it may also provide control over how many times a set of instructions in a section of code may be executed.

A program executing a section of code in a loop may continue doing so until some condition or completion event occurs. For example, a loop may execute until an evaluated result of a given expression is false. This type of loop may be referred to as a For loop. Also for example, a loop may execute for each item in a collection. Each item may be pulled from various places in memory based on a memory address. This type of loop may be referred to as a ForEach loop. There are other types of loops well known to those skilled in the art such as, but not limited to, While loops, Jump loops, Until loops, etc.

Instead of using programming languages such as C or Pascal, software applications may be developed using an object model. The object model applications may, in many respects, mimic traditional programming language. An object model may be defined as a collection of objects and relationships. Each of the objects may be associated with one or more properties that govern the execution behavior of the object. An object model may be a collection of objects that may be instantiated. Relationships between instantiated objects may be created to build a cohesive application. Such an object model may have a hierarchy of objects. That is, parent objects may have children objects. The objects may perform functions or operations. Each operation may define a work item to be performed within an object. The operation may perform the work of the application by, for example, copying files, downloading files, cleaning data, performing queries, etc.

A problem exists, however, in applying a programming language looping paradigm to an application built on an object model. Looping constructs in programming languages may freely access items stored throughout memory based on, for example, a memory address. Objects within an object model, on the other hand, may have implicit or explicit boundaries that hinder, for example, iterating over a collection of objects or assigning a variable to a loop.

For example, an object model may use "steps" to control the execution of an operation. To support looping, the object model may require a programmatic approach that stipulates that an object be inserted at some point in a workflow. The object may be capable of modifying the execution status of the execution engine. This object may "trick" the execution engine by indicating that a given section to be executed in a loop was not yet executed even when the section has been executed. This "tricking" may be accomplished by a script object and may be used as many times as the "loop" is needed to run. The script object may go to a parent object, traverse the object model to find the next step, apply a precedence constraint, and then modify the object model by indicating that the operation was not yet executed.

The script task method of employing a looping paradigm in an application based on an object model may be problematic. First, it is complicated. Second, in a user interface, it may not be apparent where a loop ends or starts. Therefore it may be difficult to understand and configure the loop coding. Without well-defined boundaries, there may be no way to represent the loop visually.

It would be useful, therefore, to be able to apply looping constructs to a software application based on an object model such that information or objects located outside a looping construct object may be more easily communicated to a looping construct object. Additionally, it would be useful if the looping construct may be represented visually. Such an approach may enable understanding and configuring of the loop from a user interface.

SUMMARY OF THE INVENTION

The invention enables the execution of looping constructs within an object model by providing for communication between objects. Such communication may be akin to the ability of the programming language looping constructs to pull information from various memory locations. An object within the object model may contain a looping construct such as a For or a ForEach construct. The For or ForEach object each may be contained within sub-objects or child objects of a workflow parent object and may execute more than once per parent execution based on parameters specific to them. A ForEach loop, for example, may execute once for each item in a collection through a mapping mechanism that enables the ForEach loop object to communicate with the collection. A For loop may execute until an evaluated result of a given expression is false and communicate with an object comprising a collection of variables. Placing the looping construct within a child object may preclude the use of, for example, script objects. Additionally, the invention may obviate the need to traverse a parent object in order to "trick" the parent object by indicating that the object has not yet executed.

The invention, therefore, may allow the simulation of familiar programming language looping paradigms in an object model. The invention may also enable a user to identify looping constructs contained in code. This may enable, for example, a user to know where and how to insert break points to determine the current state of the application during object execution. Also, an object writer may not be required to write all of the code to instigate a looping construct. Instead, the object writer may benefit from the looping code already contained in an object and therefore, the object writer need only write the code for the specific operation.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Example Computing Environment

Figure 1:
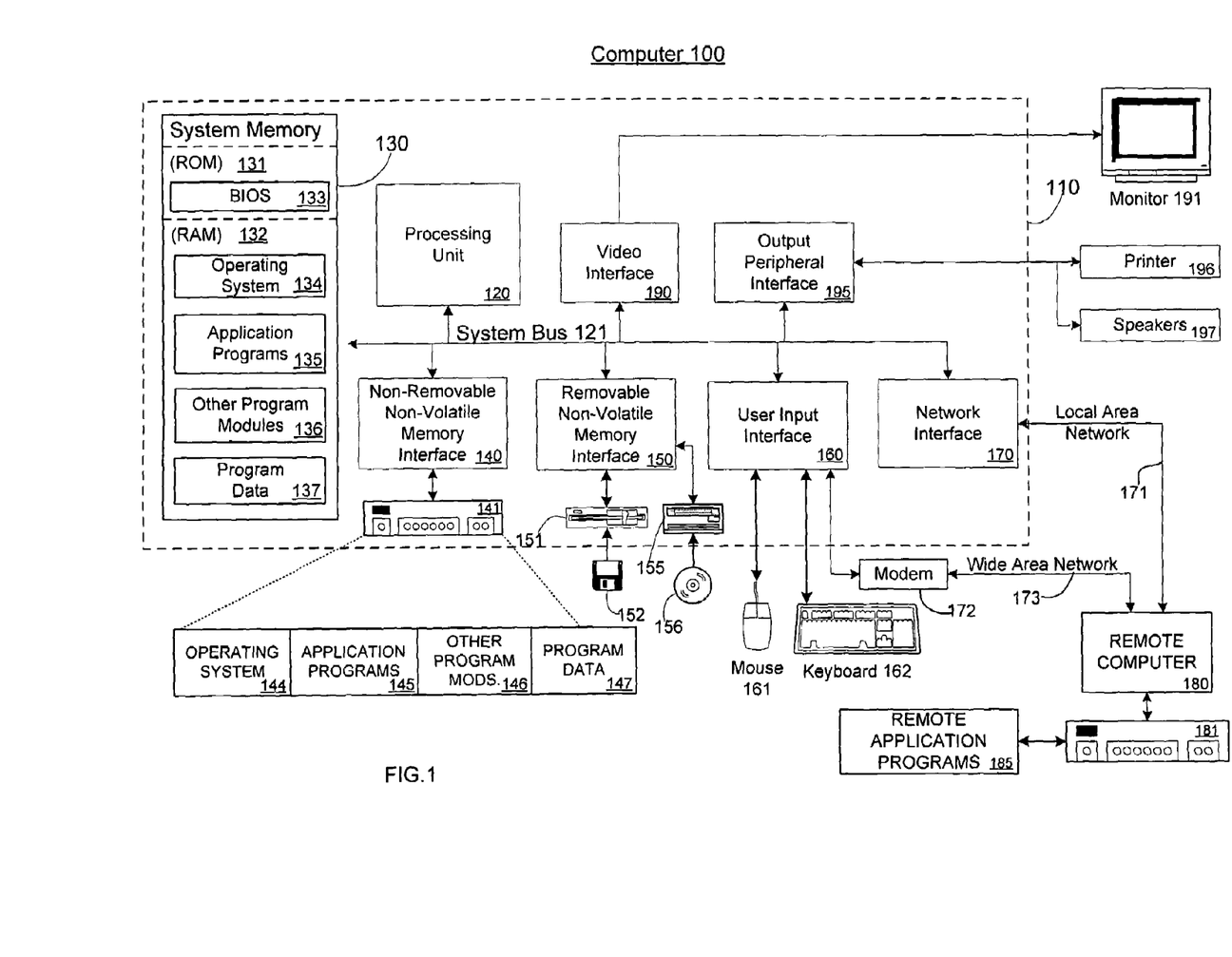
FIG. 1 is a block diagram showing an example computing environment in which aspects of looping constructs in object model software may be implemented.

FIG. 1 and the following discussion are intended to provide a brief general description of a suitable computing environment in which an example embodiment of the invention may be implemented. It should be understood, however, that handheld, portable, and other computing devices of all kinds are contemplated for use in connection with the present invention. While a general purpose computer is described below, this is but one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120a-f through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client devices can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Looping Constructs in Object Model Software

Figure 2:
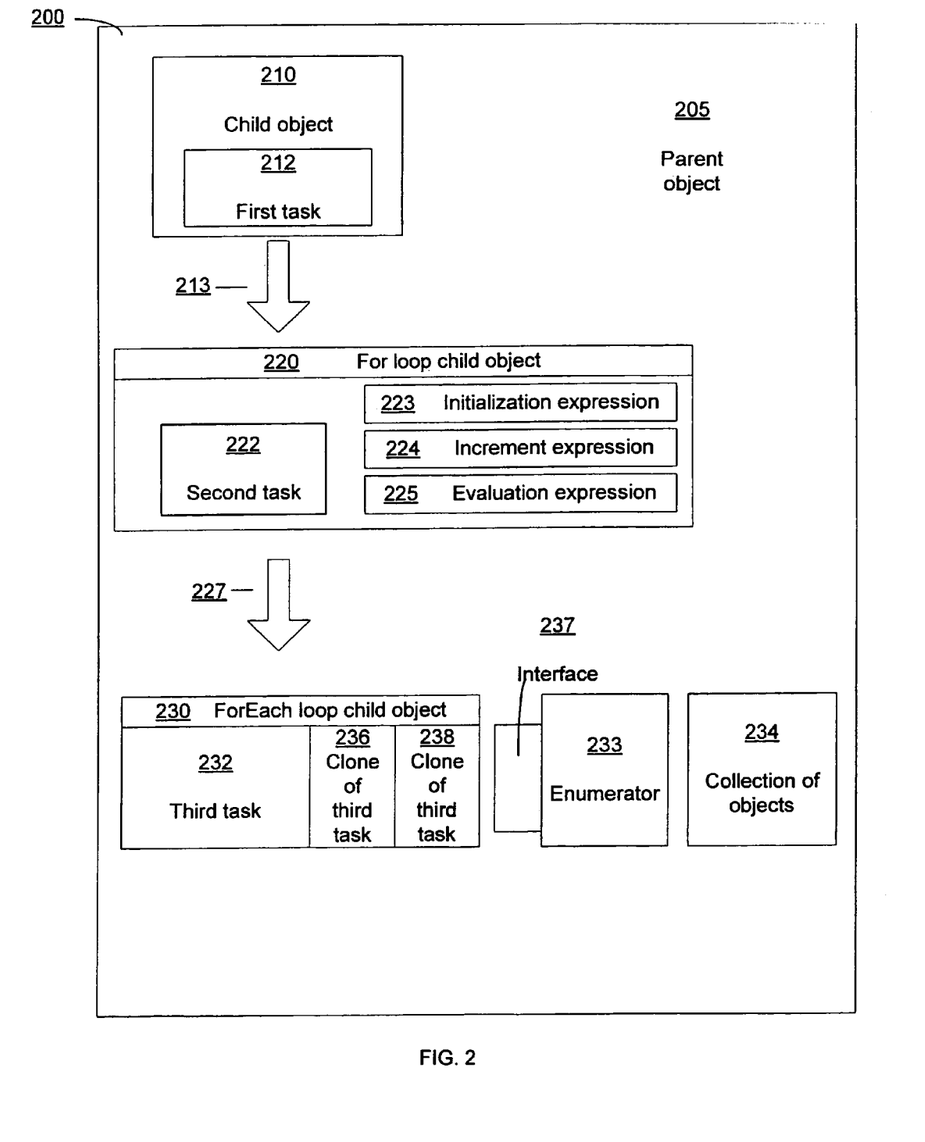
FIG. 2 is a block diagram showing an example embodiment of a system for using looping constructs in object model software.

FIG. 2 depicts a block diagram of an example system 200 of looping constructs within an object model. The object model may be executed on a computer such as the computer 110 described with regard to FIG. 1. The system 200 may include a parent object 205 containing child objects 210, 220, 230. Child objects 210, 220, 230 may each include one or more tasks 212, 222, 232. The system 200 may also include an enumerator 233 and a collection of objects 234.

The object model may be similar to a programming language paradigm. A parent object such as the parent object 205 may have workflow constraints. Each task 212, 222, 232 within each child object 210, 220, 230 may be set to run in an ordered object workflow. A task as used in this specification may be an object that performs a function or operation or has a certain purpose within a workflow. The ordered object workflow may be in the direction of arrows 213, 227. Generally, with the exception of tasks 222, 232 within looping objects such as For loop child object 220 and ForEach loop child object 230, tasks within a parent object and also within child objects may execute in a linear fashion. Alternatively, such tasks may execute consistent with any precedence constraints. Precedence constraints may control a sequence in which tasks execute.

In the system 200, child objects 220, 230 may be looping constructs. The looping constructs of child objects 220, 230 may include respective second and third tasks. It should be recognized that child objects 220, 230 may contain any number of tasks and that the second and third tasks 222, 232 are provided for example purposes and may be other looping constructs.

In the example embodiment of the invention depicted in FIG. 2, the looping construct is implemented through use of the object model. Each task 212, 222, 232 may perform a specific function and may be given only enough information to perform the function. In this way, the workflow of the parent object 205 is broken down into the execution of tasks 212, 222, 232 within individual child objects 210, 220, 230. Such use eliminates the need for cumbersome and confusing coded script tasks described above. Instead of using a "step" used in other hierarchical object models, the parent object 205 may contain child objects 210, 220, 230, each of which may execute its task or function. In this way, the traditional programming language looping paradigm may be mimicked in an object model such as the parent object 205. The system 200 may execute designated workflow repetitively within the child objects 220, 230.

The child object 210 of parent object 205 may contain a first task 212. The first task 212 may be executed first because it is first in a linear workflow of the parent object 205. Alternatively, the first task 212 may be executed first because a precedence constraint has been applied within the parent object 205 indicating as much. The child object 210 may include logic within the first task 212 and may provide parameters. The first task 212 may be any type of task or function. For example, the first task 212 may be opening a new document, downloading a file or files, cleaning data, or performing a query or queries. The first task 210 may be a looping function as well.

The For loop child object 220 may include a looping construct such as a For loop. The ForEach loop child object 230 may include a looping construct such as a ForEach loop. A runtime execution environment within the parent object 205 may "know" about the looping constructs within the child objects 220, 230, and also may know how to execute them. Additionally, the child objects 220, 230 that contain looping constructs may know how to interact with the runtime execution environment of the parent object 205.

The For loop child object 220 may enable the execution of the same workflow over and over, based on an expression. The child object 220 may include execution of a second task 222 within a For loop. The child object 220 additionally could contain other tasks in addition to the second task 222. The runtime execution environment of the parent object 205 may know about the For loop child object 220 and therefore may know that the second task 222 may be executed numerous times. The For loop child object 220 may contain an initialization expression 223 which may, for example, obtain a variable such as a "count" variable. The "count" variable may be set to 0. The For loop child object 220 may also contain an increment expression 224, which may increase the variable "count" by the number of times that the second task 222 has been executed. The child object 220 may also contain an evaluation expression 225. The evaluation expression 225 may determine when the variable "count" equals a predetermined number. When the evaluation expression determines that "count" equals the predetermined number, execution of the second task 222 may be completed. The workflow within parent object 205 may then proceed to the next object based on a linear progression or on a precedence constraint.

The parent object 205 may include a ForEach loop child object 230 within its workflow. The ForEach loop child object 230 may include a third task 232 to be executed for each character in the enumerator 233. The enumerator 233 may be a wrapper around the collection of objects 234. The collection of objects 234 may be, for example, tables within a database, databases on an enterprise network, node lists, or sub-elements within an extensible markup language (XML) document. The collection of objects may be any other type of object over which the ForEach loop child object 230 may iterate. The enumerator 233 may be of any type, and the type may depend on the type of object over which the third task 232 may iterate. The enumerator 233 may be, for example, a file enumerator for iterating over files. The enumerator 233 may be a table enumerator used for iterating over table. Alternatively, it may be a row enumerator used for iterating over rows in a table. Additionally, the enumerator 233 may be specific to the object over which the third task 232 may iterate. If, for example, the enumerator is a row enumerator, then it may include a data base name, a user name, a password, and a name of a table. A row enumerator may also need to know which rows will be needed for the iteration—which rows will be enumerated. The row enumerator may communicate with a server (not shown) to obtain data it needs. The row enumerator may be populated as it receives information about each row. Alternatively, the row enumerator may execute a "batch get" and fill in all elements in the enumerator at one time. The logic for populating the enumerator 233 may be included within the enumerator 233. The details provided for a row enumerator are provided for example only. A row enumerator as well as other types of enumerators may require other data and have varying properties.

The ForEach loop object 230 may be in communication with the enumerator 233. Through the enumerator 233, the ForEach loop child object 230 may enumerate or iterate over each character in the collection of objects 234. When the third task 232 within the ForEach loop child object 230 is executed, the ForEach loop child object 230 may communicate with the enumerator through an interface 237. The enumerator 233 may provide its first item to the ForEach loop child object 230 for use in execution of the third task 232.

The enumerator 233 may notify the ForEach loop child object 230 when it has provided every item in the enumerator 233. The ForEach loop child object 230 may know how to process this completion information such that the parent object 205 may move on to the next object in the workflow.

Additionally, the ForEach loop child object 230 may include duplicates or "clones" of the third task 232. That is, the ForEach loop child object may have a clone or clones of the third task 236, 238. It should be recognized that there may be any number of clones of the task or tasks within a ForEach loop child object 230. This cloning also may be referred as "parellizing"—that is, each of the cloned tasks 236, 238 may be executed in parallel with (or at the same time as) the third task 232. The cloning or copying may be completed by saving the third task 232 to an extensible markup language (XML) document, creating a new task based on the third task 232, and loading the new task into the ForEach loop child object.

The third task 232 may be executed using the values for properties provided by the enumerator 233. While the third task 232 is executing, the enumerator 233 may provide another item from the collection of objects 234 to the clone of the third task 236. While the clone of the third task 236 is executing, the enumerator may provide another item from the collection of objects 234 to the clone of the third task 238. Additionally, if the ForEach loop child object contains more than one task, then each of the tasks may be cloned in a similar manner to expedite the execution of the loop. In this way, the ForEach loop child object may more quickly complete all of its iterations so that the parent object 205 may move more quickly down the workflow of child objects.

Figure 3:
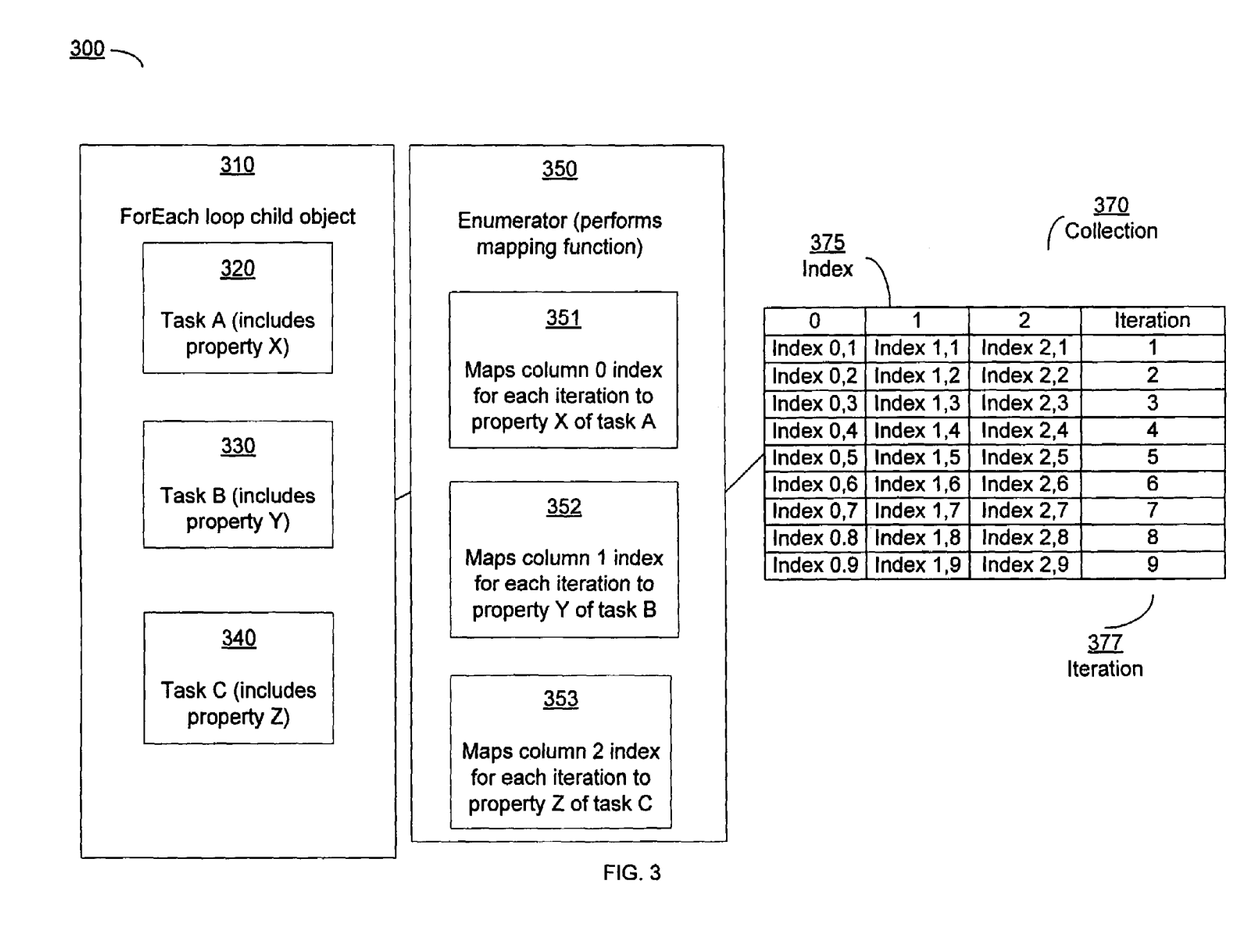
FIG. 3 is a block diagram showing an example embodiment of a system for enumerating between a collection of objects and a child object comprising a looping construct.

FIG. 3 depicts a block diagram of an example system 300 of a ForEach looping construct within an object model in accordance with one embodiment of the invention. The system 300 includes a ForEach loop child object 310, an enumerator 350, and a collection 370. The ForEach child object 310, the enumerator 350 and/or the collection 370 may reside on one or more computers such as the computer 110 described with regard to FIG. 1.

The ForEach loop child object 310 may include one or more tasks such as task A 320, task B 330, and task C 340. The tasks 320-340 may include one or more properties. In the example embodiment of the ForEach loop child object depicted 310, task A may include a property X. Property X may be a variable, and a value for property X may be required before task A may be executed. As explained below, this value may be provided by the enumerator 350. Task B 330 likewise may require a value for its property Y, and task C 340 may require a value for its property Z. Additionally, logic may be provided within the ForEach loop child object 310 such that each of the tasks 320-340 may be executed numerous times, with each execution using a different value for its variable property.

The values for the properties within the tasks 320-340 may ultimately be provided by the collection 370. The collection 370 may be any type of collection. For example, the collection 370 may be tables within a database, databases on an enterprise network, node lists, or sub-elements within an extensible markup language (XML) document, etc. The collection 370 may have values or indexes within index lists 1, 2, and 3. Such indexes may be viewed in a graphical or chart form such as depicted in the collection 370. Such indexes, however, may not actually be organized as such within the collection 370.

The enumerator 350 may obtain an index from the collection 370 and provide that index to the ForEach loop child object for use in the execution of tasks 320-340. The enumerator 350 may perform a mapping function, pulling each index from the collection 370, and assigning the index to a property such as property X, Y or Z of, respectively, tasks A, B, and C 320-340 of the ForEach loop child object. The enumerator may complete this mapping function for each iteration of the ForEach loop child object until all index values have been provided to the ForEach loop child object 310.

For example, the enumerator may comprise logic 351 such that, the first time (first iteration) that the ForEach child loop object executes, the enumerator may pull an index 375 from Index 0, 1 of the collection 370. The logic 351 may enable the enumerator 250 to assign the Index 0, 1 value to property X of task A 320. The enumerator additionally may comprise logic 352 such that, for this first iteration, the enumerator may also pull an index 375 from Index 1, 1 of the collection 370. The enumerator may assign the Index 1, 1 value to property Y of task B 330. Likewise, the enumerator may have logic 353 to pull an index 375 from Index 2, 1 of the collection 370 and assign the Index 2, 1 to property Z of task C 340. The ForEach loop child object may then execute its tasks 320-330. This may complete the first iteration.

The logic within the ForEach loop child object will provide for the tasks 320-340 to execute again, and the enumerator will provide values for properties X-Z from the second iteration row of collection 370 as it did for the first iteration. This process may repeat until, in the example shown in FIG. 3, iteration 9 is complete. Upon completion of iteration 9, the enumerator will notify the ForEach loop child object 310 that the collection 370 has no more index values to pass. The ForEach loop child object 310 may have logic to understand this, and the parent object 205 (described with regard to FIG. 2) may then move on down its object model workflow to the next object (not shown in FIG. 3).

In this way, the enumerator 350 may act as a translation layer between the collection 370 and a child object such as ForEach loop child object 310. In a coding paradigm written in, for example, C programming language, a ForEach loop may need a memory address for a property such as property X of task A 320. From the memory address, the value for the property X may be found and used. In one embodiment of the invention, the coding paradigm of the ForEach loop may be translated into the object model paradigm. In the object model paradigm, the objects such as the ForEach loop child object 310 may not know about memory locations. Therefore, a translation layer such as the enumerator 350 may be necessary to take values of objects and assign them to properties within a task such as task A 320.

Figure 4:
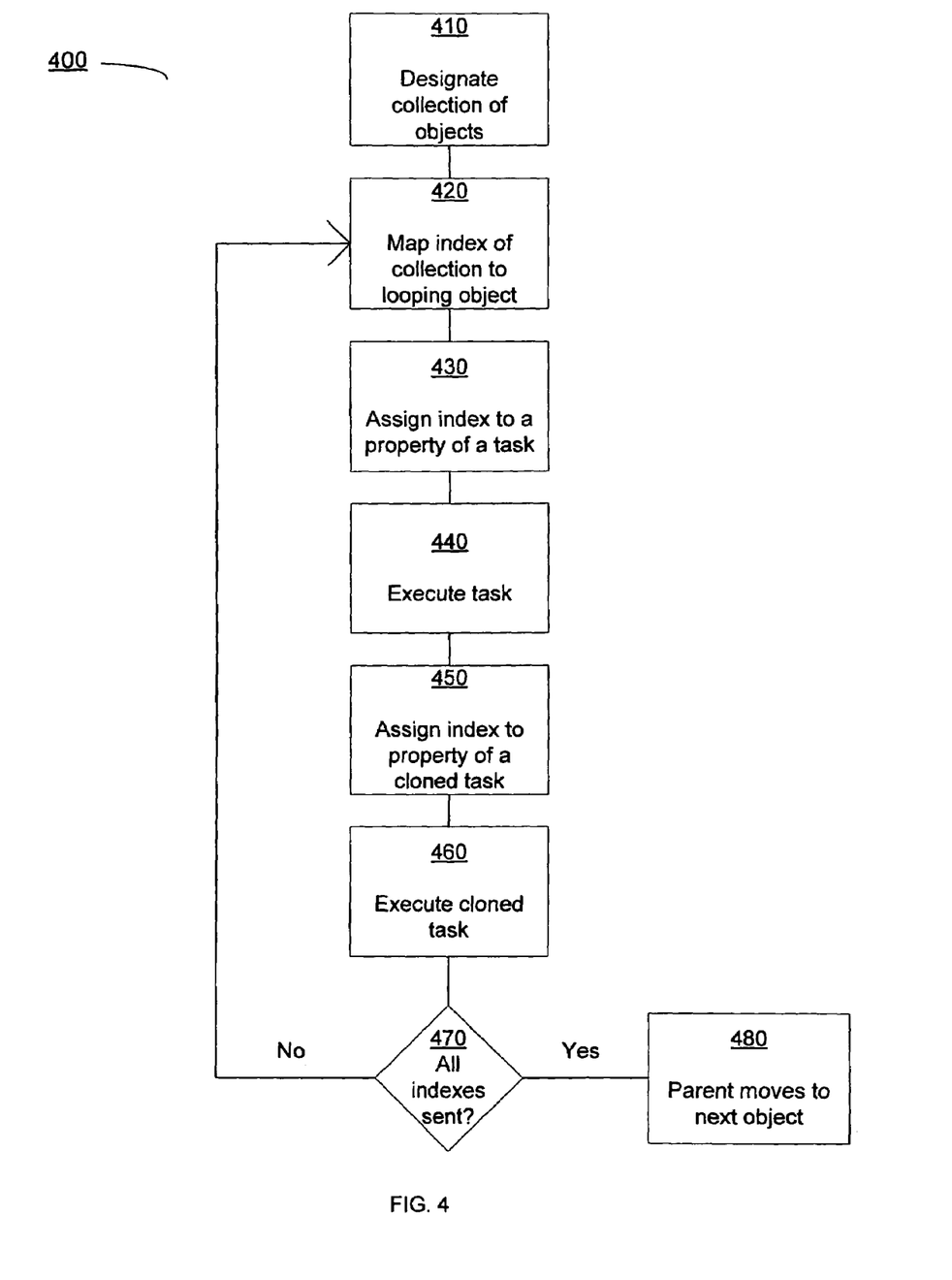
FIG. 4 is a flow diagram of a method for enumerating between a collection of objects and a child object comprising a looping construct.

FIG. 4 depicts a flow diagram of a method for enumerating between a collection of objects such as collection 370 described with regard to FIG. 3 and a child object comprising a looping construct in an object model. Such a child object may be the ForEach loop child object 310 described with regard to FIG. 3. At step 410, the ForEach loop child object 310 may designate the collection 370 as the collection over which it will iterate. The ForEach loop child object 310 may be in communication with the enumerator 350 that is capable of facilitating the iteration of the collection 370. At step 420, the enumerator 350 may map an index 375 (or element) from the collection 370 to the ForEach loop child object 310. Upon receiving the index 375, the ForEach loop child object 310 may assign, at step 430, the index 375 to a variable property of a task, such as property X of task A 320. In the event that more than one task is to be executed, such as tasks 320-340, then the enumerator 350 may provide indexes 375 for all of the properties within the tasks 320-340. The task 320 or tasks 320-340 may then be executed at step 440.

While the task 320 or tasks 320-340 are executed, at step 450, the enumerator may provide one or more indexes 375 to the ForEach loop child object 310. The ForEach loop child object 310 may assign the one or more indexes 375 to a property or properties of a cloned task or tasks at step 450. At step 460, the cloned task or tasks may be executed. The mapping may then continue until all indexes in the collection have been used in the iteration. Upon completion of the iteration, the parent object, at step 480, may move to the next object in the object model.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language; and combined with hardware implementations.

While the present invention has been described in connection with the preferred embodiments of the various figures, it is to be understood that other embodiments may be used or modifications and additions may be made to the described embodiments for performing the same function of the present invention without deviating therefrom. For example, embodiments of the invention have been described with regard to a For loop and a ForEach loop, each of which may be contained in an object. It should be recognized that other looping paradigms, such as a While or a GoTo loop may also be contained in an object in accordance with the invention. In no way is the present invention limited to the examples provided and described herein. Therefore, the present invention should not be limited to any single embodiment, but rather should be construed in breadth and scope in accordance with the appended claims.

What is claimed:

1. A system for iterating within an object-based workflow, comprising:
   a processor executing a first object, comprising:
   a second object comprising:
   a looping construct;
   a task within the looping construct; and
   a clone of the task within the looping construct, wherein the cloning of the task occurs within the looping construct, and wherein the clone of the task executes in parallel with the task; and
   wherein the second object is in communication with an enumerator for mapping a collection of objects to the second object over which the looping construct of the second object iterates, and wherein the enumerator maps an index in the collection of objects to a variable property of the task and also maps an index to a variable property of the clone of the task for each iteration of the looping construct.

2. The system of claim 1, wherein the looping construct comprises a FOR looping construct.

3. The system of claim 1, wherein the second object further comprises at least one of an initialization expression, an increment expression, and an evaluation expression.

4. The system of claim 1, wherein the looping construct comprises a FOREACH looping construct.

5. The system of claim 1, wherein the first object further comprises the collection of objects.

6. The system of claim 1, wherein the clone is created by copying the task in extensible markup language.

7. The system of claim 1, wherein a type of the enumerator depends upon a type of the objects in the collection.

8. A computer-implemented method for iterating over a collection of objects within an object model of a computer system, wherein the computer system comprises a processor and a memory, the method comprising the following steps performed by an enumerator executing on the processor, the enumerator comprising a wrapper around the collection of objects and an index for each object:
   obtaining a plurality of indexes from the collection of objects, where the collection can be any one of a plurality of different types;
   providing each index of the plurality of indexes to a task within a looping object and to a clone of the task that has been cloned within the looping object;
   assigning an index from the enumerator for each iteration of the looping object to a variable property of the task and assigning an index from the enumerator for each iteration of the looping object to a variable property of the clone of the task; and
   executing the task and the clone of the task in parallel on the processor.

9. The method of claim 8, wherein a type of the enumerator depends upon a type of the objects in the collection.

10. A computer-readable storage medium having computer-executable instructions implementing an enumerator comprising a wrapper around a collection of objects and an index for each object, the enumerator performing the following steps, comprising:
    obtaining a plurality of indexes from the collection of objects, where the collection can be any one of a plurality of different types;
    providing an index of the plurality of indexes to a task within a looping object and to a clone of the task that has been cloned within the looping object; and
    assigning the index from the enumerator for each iteration of the looping object to a variable property of the task and assigning an index from the enumerator for each iteration of the looping object to a variable property of the clone of the task; and
    wherein the task and the clone of the task execute in parallel.

11. The computer-readable storage medium of claim 10, having further computer-executable instructions for performing the step of executing the task.

12. The computer-readable storage medium of claim 10, wherein a type of the enumerator depends upon a type of the objects in the collection.

13. A computer-implemented method for iterating over a collection of objects within an object model of a computer system, wherein the computer system comprises a processor and a memory, the method comprising the following steps performed by an enumerator executing on the processor, the enumerator comprising a wrapper around the collection of objects and an index for each object:
    obtaining a plurality of indexes from the collection of objects, where the collection can be any one of a plurality of different types;
    providing each index of the plurality of indexes to a task of a looping object;
    for each iteration of the looping object, assigning a respective one of the indexes to a variable property of the task; and
    executing the task on the processor, the method further comprising:
    cloning the task within the looping object;
    assigning an index to a variable property of the clone of the task; and
    executing the clone of the task on the processor in parallel with the task.

* * * * *